(12) United States Patent
Inman (10) Patent No.: US 11,732,811 B2
(45) Date of Patent: Aug. 22, 2023

(54) DUAL SHUT-OFF VALVE

(71) Applicant: BWXT Advanced Technologies LLC, Lynchburg, VA (US)

(72) Inventor: James Brian Inman, Forest, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 0 days.

(21) Appl. No.: 17/339,601

(22) Filed: Jun. 4, 2021

(65) Prior Publication Data

US 2021/0381609 A1    Dec. 9, 2021

Related U.S. Application Data

(60) Provisional application No. 63/034,630, filed on Jun. 4, 2020.

(51) Int. Cl.
*F16K 5/04* (2006.01)
*F16K 31/60* (2006.01)
*F16K 11/14* (2006.01)

(52) U.S. Cl.
CPC .......... *F16K 5/0421* (2013.01); *F16K 5/0407* (2013.01); *F16K 11/14* (2013.01); *F16K 31/60* (2013.01); *F16K 2200/202* (2021.08)

(58) Field of Classification Search
CPC .......... F16K 11/12; F16K 11/14; F16K 11/20; F16K 11/207; F16K 11/085; F16K 11/053; F16K 5/0421; F16K 2200/202
See application file for complete search history.

(56) References Cited

U.S. PATENT DOCUMENTS

| | | | | |
|---|---|---|---|---|
| 689,618 A | * | 12/1901 | Huxley | F16K 11/20 137/613 |
| 1,496,584 A | * | 6/1924 | McCrink | F16K 11/12 137/555 |
| 2,769,456 A | * | 11/1956 | Atkinson | F16K 5/00 137/637.5 |
| 3,135,293 A | * | 6/1964 | Eldone | F16K 5/0421 137/625.46 |
| 3,700,003 A | * | 10/1972 | Smith | F16K 5/0264 251/207 |

(Continued)

OTHER PUBLICATIONS

International Search Report and Written Opinion, PCT/US2021/35957, dated Sep. 9, 2021, 7 pages.

*Primary Examiner* — David Colon-Morales
(74) *Attorney, Agent, or Firm* — Nelson Mullins Riley & Scarborough LLP (57) ABSTRACT

A dual shut-off valve including a valve body defining an interior cavity and a flow tube passing therethrough, an outer cylinder including a body portion defining an interior cavity and a through hole passing therethrough, the outer cylinder being rotatably disposed within the interior cavity of the valve body, and an inner cylinder including a body portion defining a through hole passing therethrough, the inner cylinder being rotatably disposed within the interior cavity of the outer cylinder, wherein the inner cylinder and the outer cylinder are both rotatable between a first position in which the through holes of the outer cylinder and the inner cylinder are aligned with the flow tube and a second position in which the through holes of the outer cylinder and the inner cylinder are transverse to the flow tube.

20 Claims, 8 Drawing Sheets

(56) References Cited

U.S. PATENT DOCUMENTS

| | | | | |
|---|---|---|---|---|
| 3,753,853 | A * | 8/1973 | Hans-Peter | G21C 9/001 376/281 |
| 3,802,457 | A * | 4/1974 | Wurzburger | F16K 31/5284 251/286 |
| 3,860,032 | A * | 1/1975 | Rogers | F16K 5/0605 251/315.08 |
| 3,898,914 | A | 8/1975 | Shellhause | |
| 4,222,413 | A * | 9/1980 | Wulf | F16K 11/0853 251/188 |
| 4,286,624 | A * | 9/1981 | Clausen | F16K 11/207 137/255 |
| 4,655,252 | A * | 4/1987 | Krumhansl | F16K 11/0853 251/59 |
| 6,474,363 | B1 * | 11/2002 | Stephenson | F16K 11/207 137/883 |
| 6,560,987 | B2 | 5/2003 | Kreger et al. | |
| 6,886,508 | B1 * | 5/2005 | Luffy | F01M 3/00 123/73 AD |
| 8,770,223 | B2 * | 7/2014 | Reck | F16K 5/0605 251/315.06 |
| 8,839,817 | B2 * | 9/2014 | Dederich | F16K 5/0442 251/249.5 |
| 9,874,283 | B1 * | 1/2018 | Shih | F16K 27/065 |
| 10,115,488 | B2 * | 10/2018 | Han | G21C 15/24 |
| 10,665,355 | B2 * | 5/2020 | Kim | G21C 1/326 |
| 2018/0094735 | A1 | 4/2018 | Clement et al. | |

\* cited by examiner

FIG. 1

(PRIOR ART)

DUAL SHUT-OFF VALVE

CLAIM OF PRIORITY

This application claims priority to U.S. Provisional Application No. 63/034,630, filed Jun. 4, 2020, the entire disclosure of which is incorporated by reference herein.

TECHNICAL FIELD

The presently-disclosed invention relates generally to shut-off valves for controlling the flow of fluids in nuclear reactors and, more specifically, to shut-off valves that provide dual shut-off capabilities in a compact design.

BACKGROUND

Figure 1:
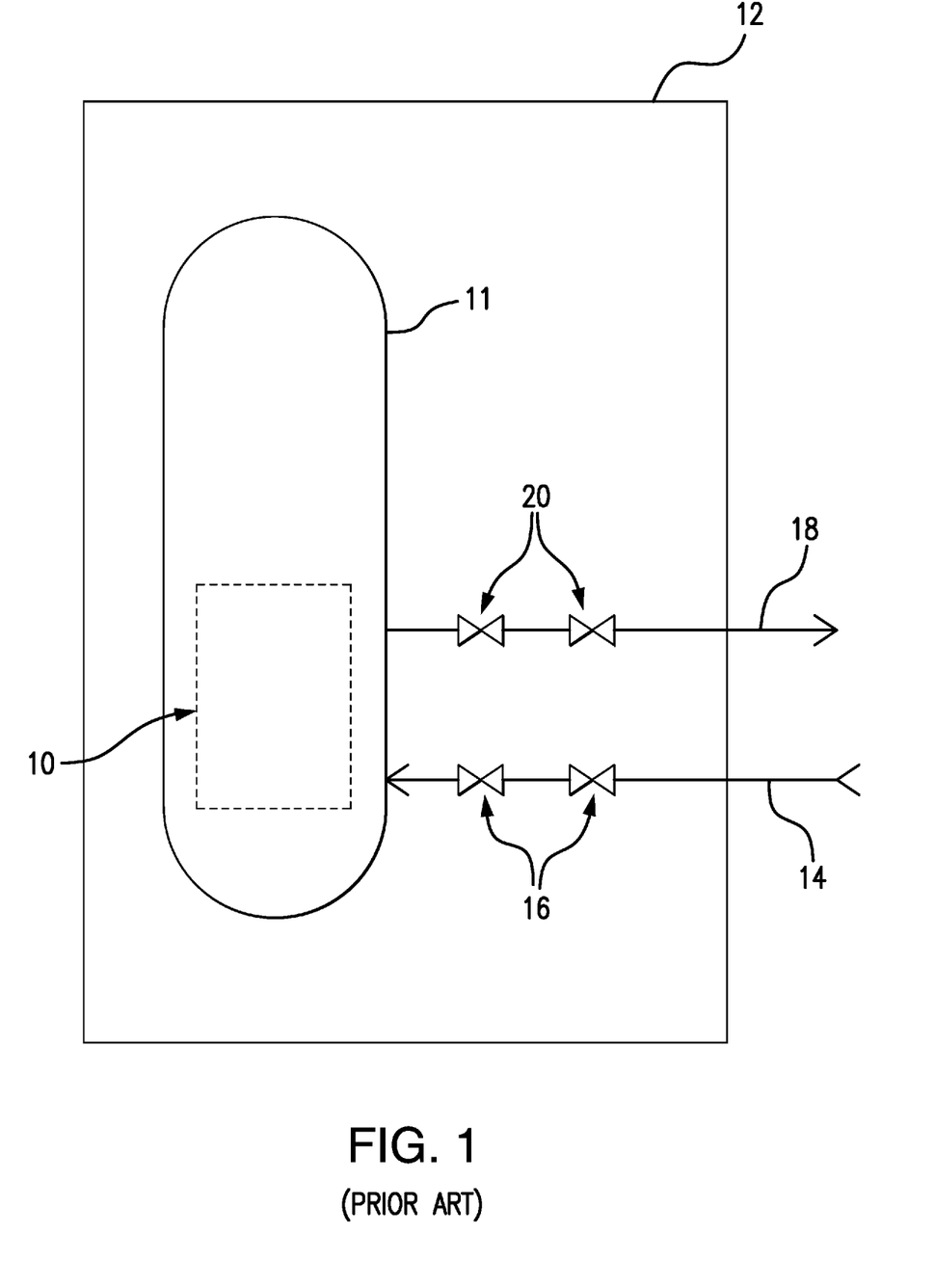
FIG. 1 is a schematic diagram of dual isolation valves in a prior art nuclear reactor.

Each primary coolant line into and out of a nuclear reactor pressure vessel 11 that also exits the containment building 12 in which a nuclear reactor 10 is disposed must contain two independently operable shut-off, or isolation, valves that may be operated in series. The reasoning behind the redundancy is based on a potential coolant line break, or Loss Of Coolant Accident (LOCA). if a coolant line breaks and one shut-off valve fails, the remaining shut-off valve may still be used to secure the flow of primary coolant through the coolant line. FIG. 1 depicts a typical nuclear reactor 10 within a containment building 12. As shown, the supply coolant line 14 includes two independent check valves 16 in series. The coolant exit line 18 includes two manual/electro-mechanical actuated shut-off valves 20 in series. As well, redundant shut-off valves may also be used in other non-nuclear power plants or vessels where a single valve failure could lead to a catastrophic accident.

Figure 2:
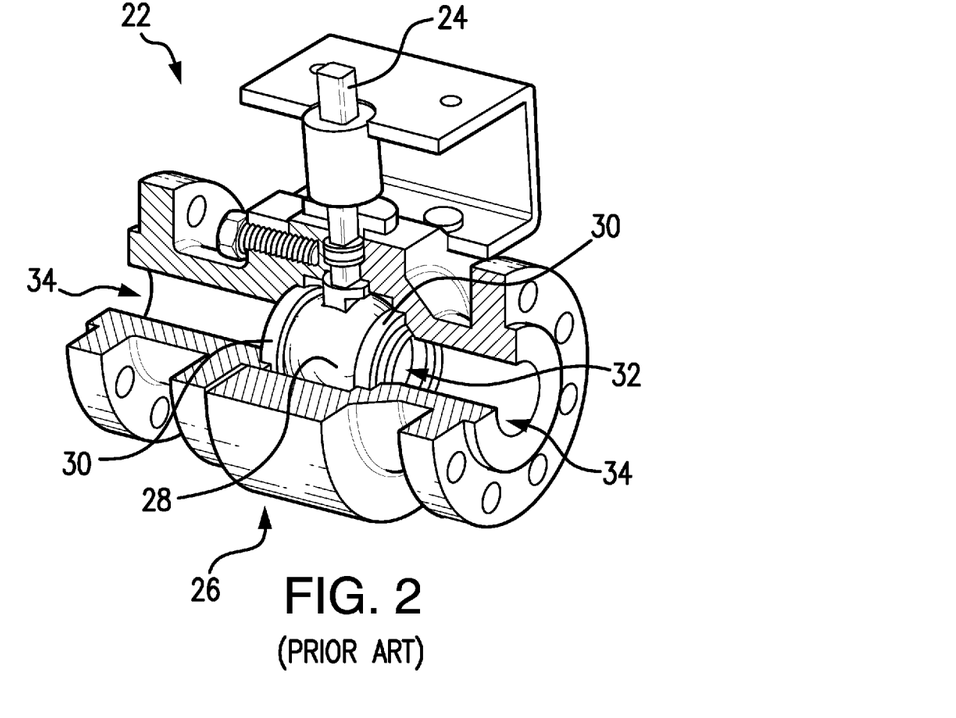
FIG. 2 is a partial cross-sectional view of a prior art ball-type shut-off valve.
Figure 3:
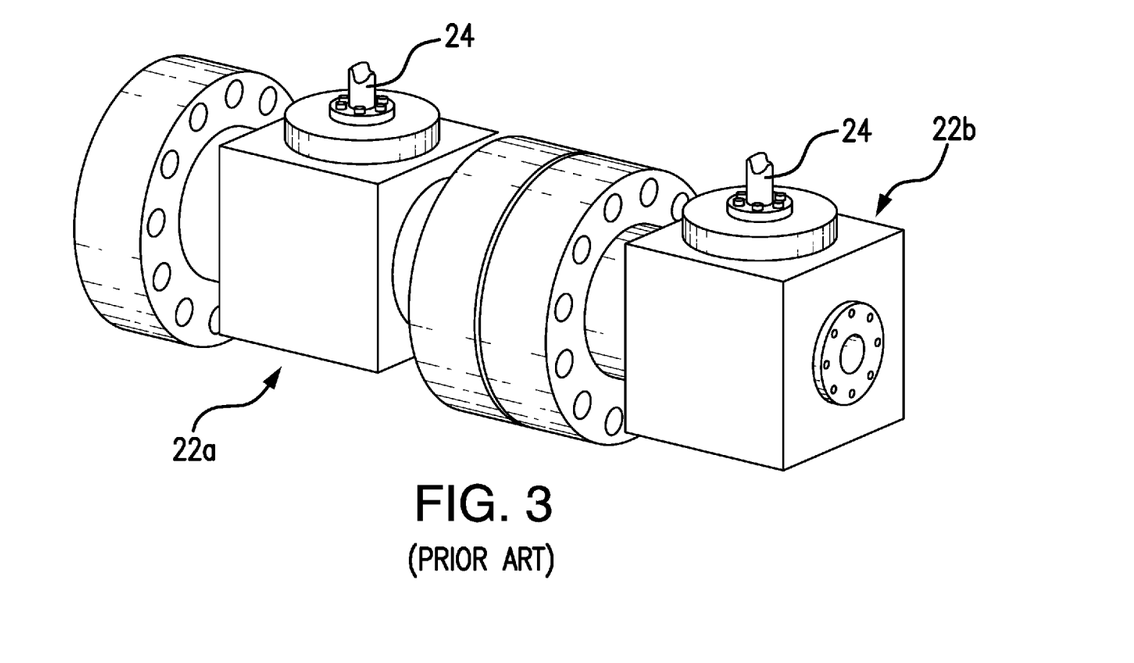
FIG. 3 is a perspective view of two prior art shut-off valves in series to provide redundant shut-off capability.

FIG. 2 is a cutaway view of a typical shut-off valve 22. The prior art shut-off valve 22 consists of four primary components, a stem 24, a body 26, a rotating ball or cylinder 28, and leak tight seats or O-rings 30. As is known, for a typical shut-off valve 22, the stem 24 rotates the ball/cylinder 28 a quarter turn (90°) to transition between an open flow channel (as shown) and a closed flow channel. The ball/cylinder 28 contains a through hole 32 that, when aligned with the flow tube 34 of the body 26, fluid or gas is allowed to pass from the first side of the shut-off valve 22 to the second side. When the ball/cylinder 28 is rotated 90° from the position shown in FIG. 2, the through hole 32 of the ball/cylinder 28 is no longer aligned with the flow tube 34, thereby preventing a fluid or gas from passing through the shut-off valve 22. To accomplish a redundant system, two shut-off valves 22a, 22b are aligned in series. Typically, the two shut-off valves 22a, 22b are bolted to each other end-to-end, as shown in FIG. 3. Due to the size of each individual shut-off valve 22a, 22b, two valves in series can be quite long. As such, the utilization of two standard shut-off valves 22a, 22b in series can be problematic in those instances where space is limited, such as, but not limited to, nuclear reactor containments as are used on naval vessels.

Figure 4:
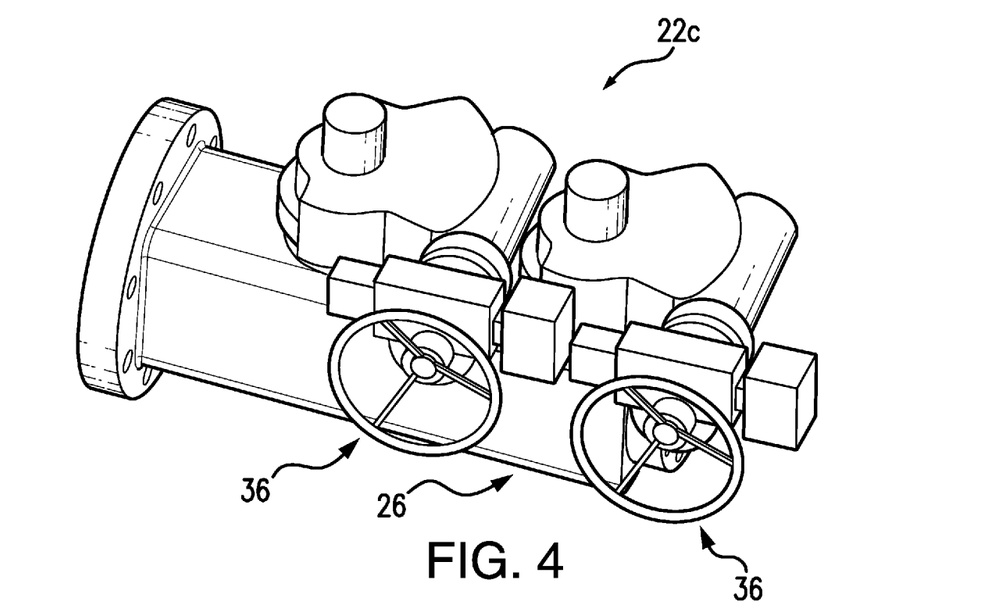
FIG. 4 is a perspective view of a two ball-type shut-off valve, the rotational balls being in series, with their valve actuators disposed on the same side of the assembly.
Figure 5:
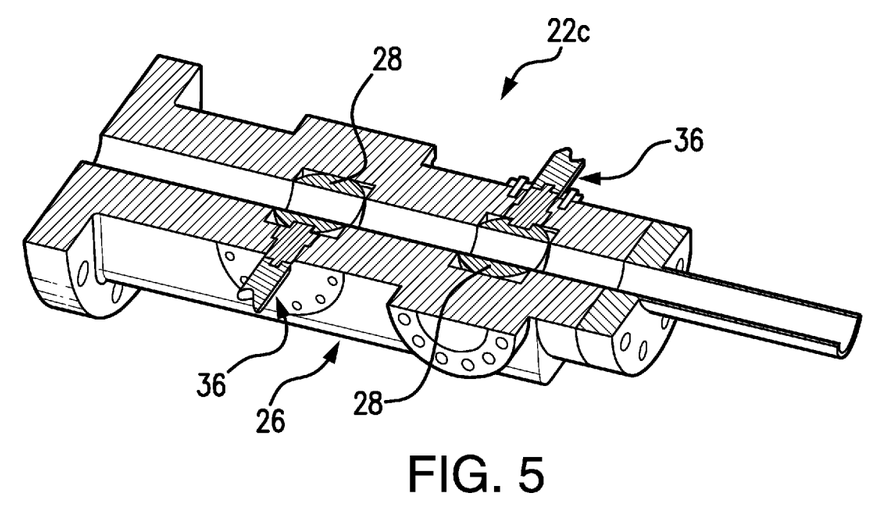
FIG. 5 is a perspective cut-away view of a two ball-type valve, the rotational balls being in series, with their valve actuators disposed on opposite sides of the assembly.

As shown in FIG. 4, in alternate redundant arrangements, a dual shut-off ball/cylinder valve 22c includes two balls/cylinders 28 disposed within the same valve body 26. While reducing the overall length of the valve as opposed to the two separate shut-off valves 22a, 22b (FIG. 2) that are bolted together, large valve actuators 36 limit the ability to reduce the valve's overall length if the valve actuators 36 are disposed on the same side of the valve body 26. One solution to help reduce the overall length of the shut-off valve 22c is to place the actuators 90° or 180° from each other, as shown in FIG. 5. Although configurations of the actuators 36 may reduce the overall length of the shut-off valve 22c, the width must still be at least as wide as the width of the two balls/cylinders along the direction of potential flow.

There at least remains a need, therefore, for systems and methods for controlling the flow of primary coolant through coolant lines that pass through a containment of a nuclear reactor.

SUMMARY OF INVENTION

An embodiment of a dual shut-off valve in accordance with the present invention includes a valve body defining an interior cavity and a flow tube passing therethrough, an outer cylinder including a body portion defining an interior cavity and a through hole passing therethrough, the outer cylinder being rotatably disposed within the interior cavity of the valve body, and an inner cylinder including a body portion defining a through hole passing therethrough, the inner cylinder being rotatably disposed within the interior cavity of the outer cylinder, wherein the inner cylinder and the outer cylinder are both rotatable between a first position in which the through holes of the outer cylinder and the inner cylinder are aligned with the flow tube, and a second position in which the through holes of the outer cylinder and the inner cylinder are transverse to the flow tube.

An embodiment of a nuclear reactor in accordance with the present invention provides a nuclear reactor disposed within a containment structure, having a reactor core disposed within a pressure vessel, a primary coolant inlet line passing through both the pressure vessel and the containment structure, and a first dual shut-off valve both disposed within the containment structure and in fluid communication with the primary coolant inlet line, having a valve body defining an interior cavity and a flow tube passing therethrough, an outer cylinder including a body portion defining an interior cavity and a through hole passing therethrough, the outer cylinder being rotatably disposed within the interior cavity of the valve body, and an inner cylinder including a body portion defining a through hole passing therethrough, the inner cylinder being rotatably disposed within the interior cavity of the outer cylinder, wherein the inner cylinder and the outer cylinder are both rotatable between a first position in which a longitudinal center axis of the through hole of the outer cylinder and a longitudinal center axis of the inner cylinder are aligned with a longitudinal center axis of the flow tube, and a second position in which the longitudinal center axes of the through holes of the outer cylinder and the inner cylinder are not aligned with the longitudinal center axis to the flow tube.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not, all embodiments of the invention are shown. Indeed, this invention may be embodied in many different forms and should not be construed as limited to the embodiments set forth herein but, rather, these embodiments are provided so that this disclosure will satisfy applicable legal requirements.

Repeat use of reference characters in the present specification and drawings is intended to represent same or analogous features or elements of the invention according to the disclosure.

DESCRIPTION OF THE PREFERRED EMBODIMENTS

Reference will now be made to presently preferred embodiments of the invention, one or more examples of which are illustrated in the accompanying drawings. Each example is provided by way of explanation, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of a dual shut-off valve, such as but not limited to "vertical," "horizontal," "top," "bottom," "above," or "below," refer to directions and relative positions with respect to the dual shut-off valve's operation, as indicated in FIGS. 8A through 8D. Thus, for instance, the terms "vertical" and "top" refer to the vertical orientation and relative upper position in the perspective of FIGS. 8A through 8D, and should be understood in that context, even with respect to a dual shut-off valve that may be disposed in a different orientation.

Further, the term "or" as used in this application and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "and" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "and," and "the" may include plural references, and the meaning of "in" may include "in" and "on." The phrase "in one embodiment," as used herein, does not necessarily refer to the same embodiment, although it may.

Figure 6:
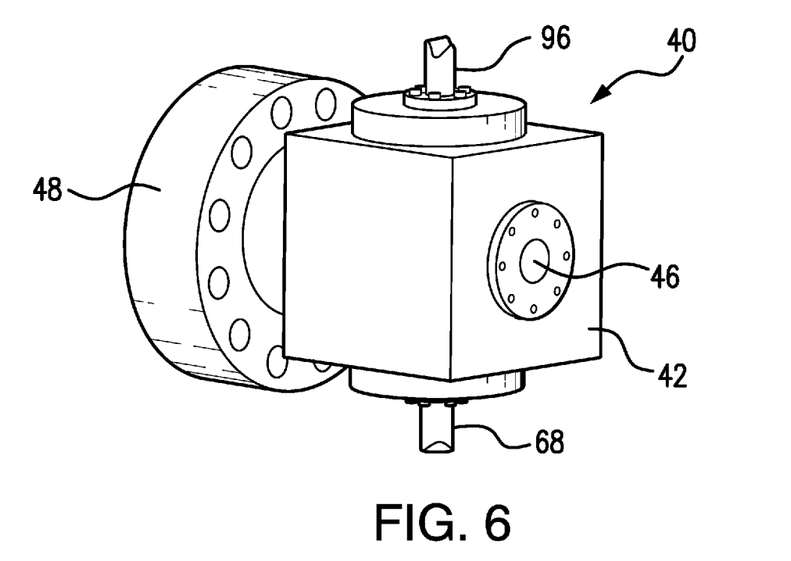
FIG. 6 is a perspective view of a dual shut-off valve in accordance with an embodiment of the present invention.
Figure 7A:
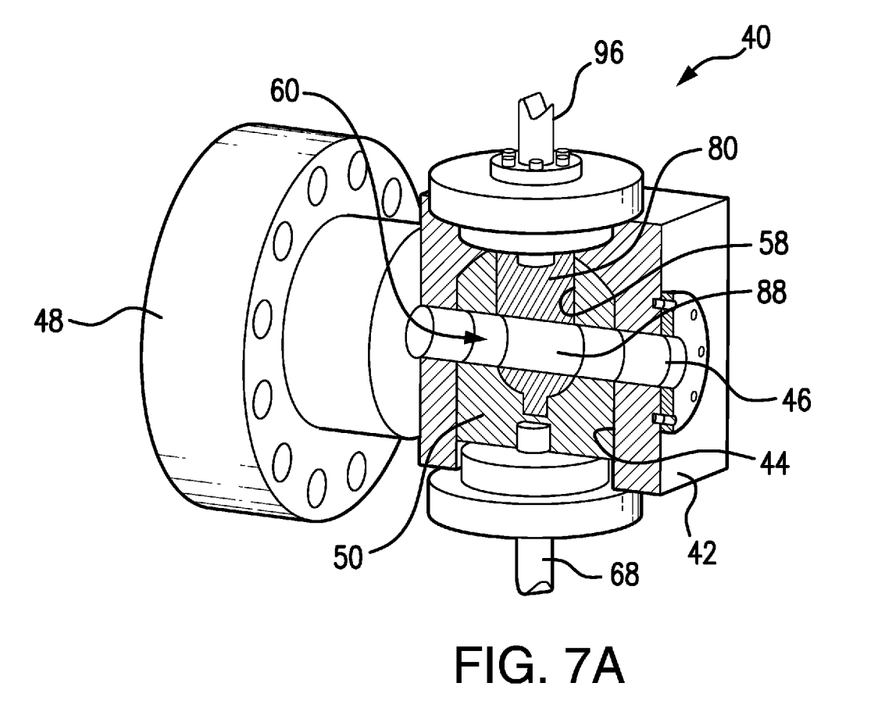
FIGS. 7A and 7B are a cross-sectional view and an exploded cross-sectional view, respectively, of the dual shut-off valve shown in FIG. 6.
Figure 7B:
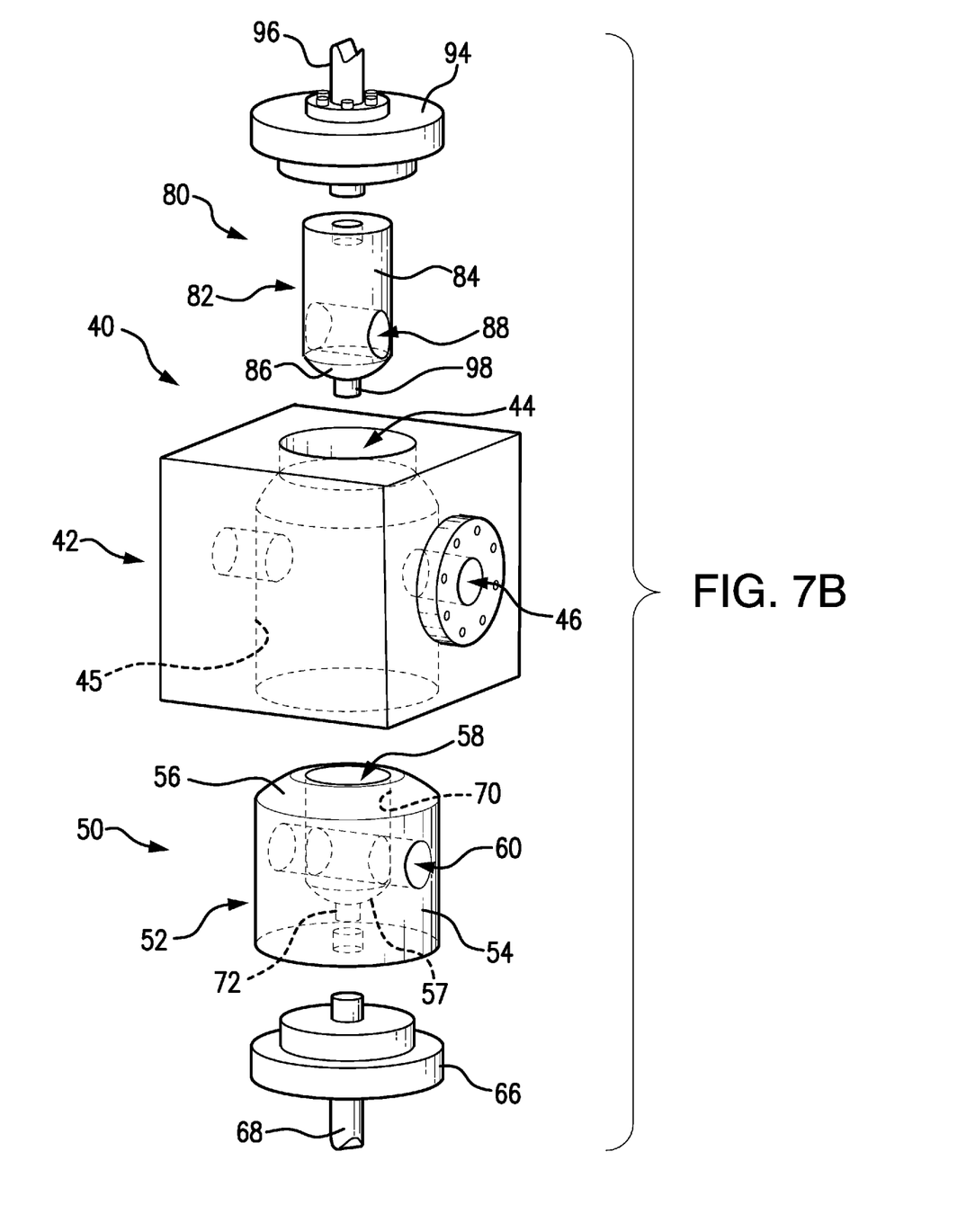

Referring now to the figures, a dual shut-off valve 40 in accordance with an embodiment of the present invention is shown in FIGS. 6, 7A, and 7B. As shown, the dual shut-off valve 40 includes a valve body 42 that defines an interior cavity 44, and a flow tube 46 that is in fluid communication with the interior cavity 44. One or more flanges 48 are provided for connecting the dual shut-off valve 40 to associated piping (not shown). An outer ball or cylinder 50 that is rotatingly disposed within the interior cavity 44 of the valve body 42 and defines an interior cavity 58 and a through hole 60 that is in fluid communication therewith. As discussed in greater detail below, the outer surface of the outer cylinder 50 is correspondingly-shaped to the inner surface of the valve body 42 that defines the interior cavity 44 of the valve body 42.

As noted above, the outer cylinder 50 is rotatable within the valve body 42 so that the through hole 60 of the outer cylinder 50 may be aligned with the flow tube 46 of the valve body 42. Similarly, an inner ball or cylinder 80 is rotatably disposed within the interior cavity 58 of the outer cylinder 50, and defines a through hole 88 therethrough. The outer surface of the inner cylinder 80 is correspondingly-shaped to the inner surface of the interior cavity 58 of the outer cylinder 50, such that the inner cylinder 80 is rotatable with respect to the outer cylinder 50. As such, the through hole 88 of the inner cylinder 80 may be aligned with the through hole 60 of the outer cylinder 50, which may be aligned with the flow tube 46 of the valve body 42, thereby providing a flow path through the dual shut-off valve 40.

Figure 8A:
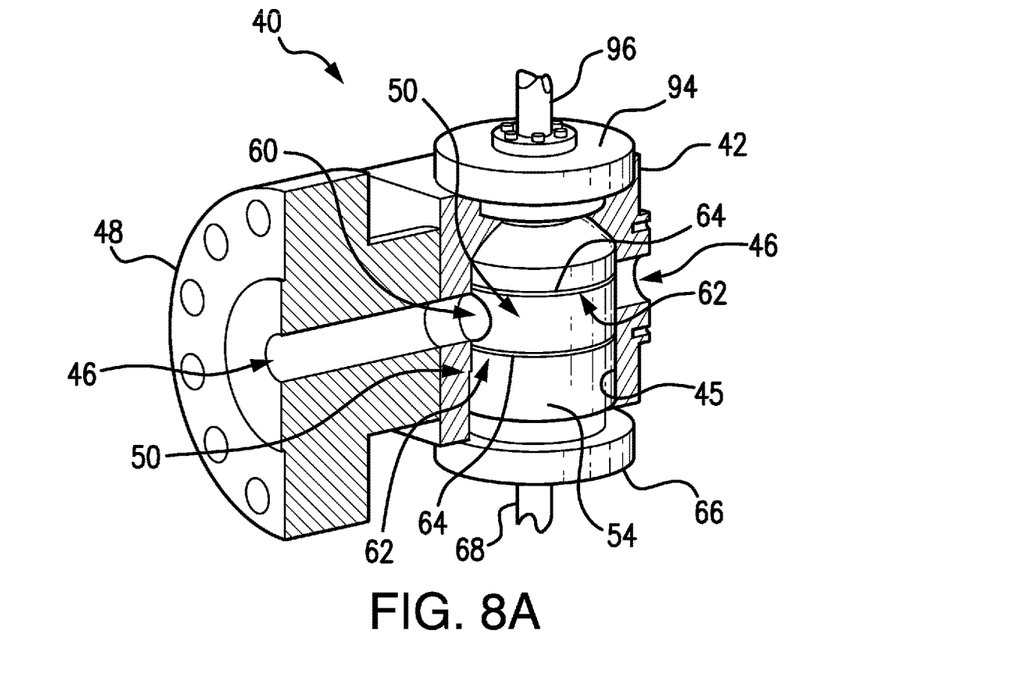
FIGS. 8A through 8D are partial cross-sectional views showing operational positions of the dual shut-off valve shown ire FIGS. 7.
Figure 8B:
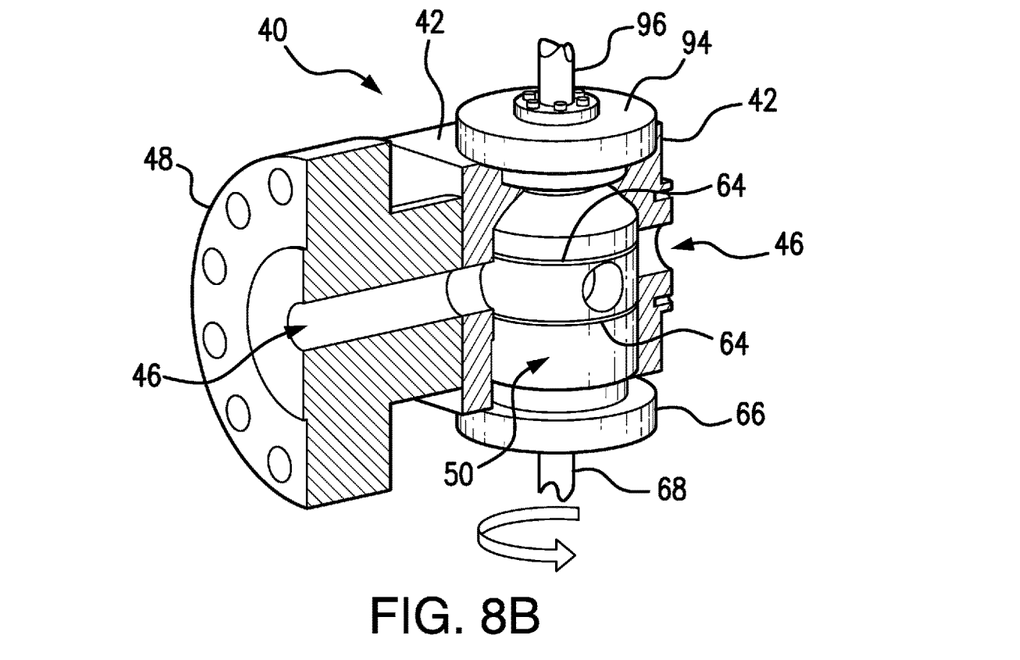

As best seen in FIG. 7B, the outer cylinder 50 includes a substantially cylindrical body portion 52 that includes a dome-shaped outer surface portion 56 at its distal end, and a cylindrical outer surface portion 54 extending from its proximal end to the dome-shaped outer surface portion 56. Referring additionally to FIG. 8A, a pair of annular grooves 62 are formed in the cylindrical outer surface portion 54 of the body portion 52 above and below the through hole 60. A pair of O-rings 64 are received in the annular grooves 62 such that a watertight or gastight seal is formed between the O-rings 64 and the cylindrical sidewall 45 of the interior cavity 44 of the valve body 42, both above and below the through hole 60. A bonnet 66 is disposed at the proximal end of the body portion 52 of the outer cylinder 50, and an actuator stem 68 extends therethrough and is affixed to the proximal end of the body portion 52 of the outer cylinder 50. The actuator stem 68 may be used to rotate the outer cylinder 50 from a first position in which the through hole 60 is aligned with the flow tube 46 of the valve body 42, as shown in FIG. 8A, to a second position in which the through hole 60 of the outer cylinder 50 is not aligned with the flow tube 46 of the valve body 42, thereby preventing the flow of fluid through the dual shut-off valve 40. Referring again to FIG. 7B, the outer cylinder 50 defines an interior cavity 58 therein. As best seen in FIG. 7B, the interior cavity 58 extends from the distal end, or dome-shaped outer surface portion 56, of the body portion toward the proximal end of the body portion 52, and includes a substantially cylindrical sidewall portion 70 and a dome-shaped bottom wall 57. Additionally, a trunnion recess 72 is formed along a longitudinal center axis of both the outer cylinder 50 and the inner cylinder 80.

Still referring to FIG. 7B, the inner cylinder 80 includes a body portion 82 having a substantially cylindrical outer surface portion 84 and a dome-shaped outer surface portion 86 at its distal end. The cylindrical outer surface portion 84 and dome-shaped outer surface portion 86 of the inner cylinder 80 are correspondingly-shaped to the cylindrical sidewall 55 and dome-shaped bottom wall 57 of the interior cavity 58 defined by the outer cylinder 50. As such, the inner cylinder 80 is rotatable with respect to both the outer cylinder 50 and the valve body 42 of the dual shut-off valve 40.

Figure 8C:
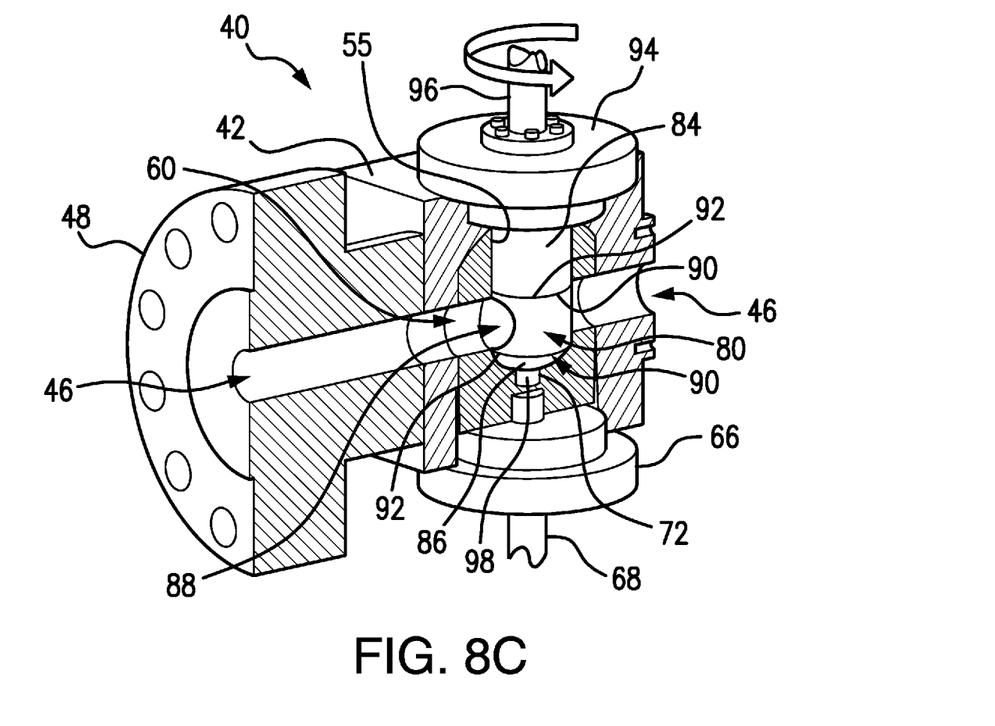
Figure 8D:
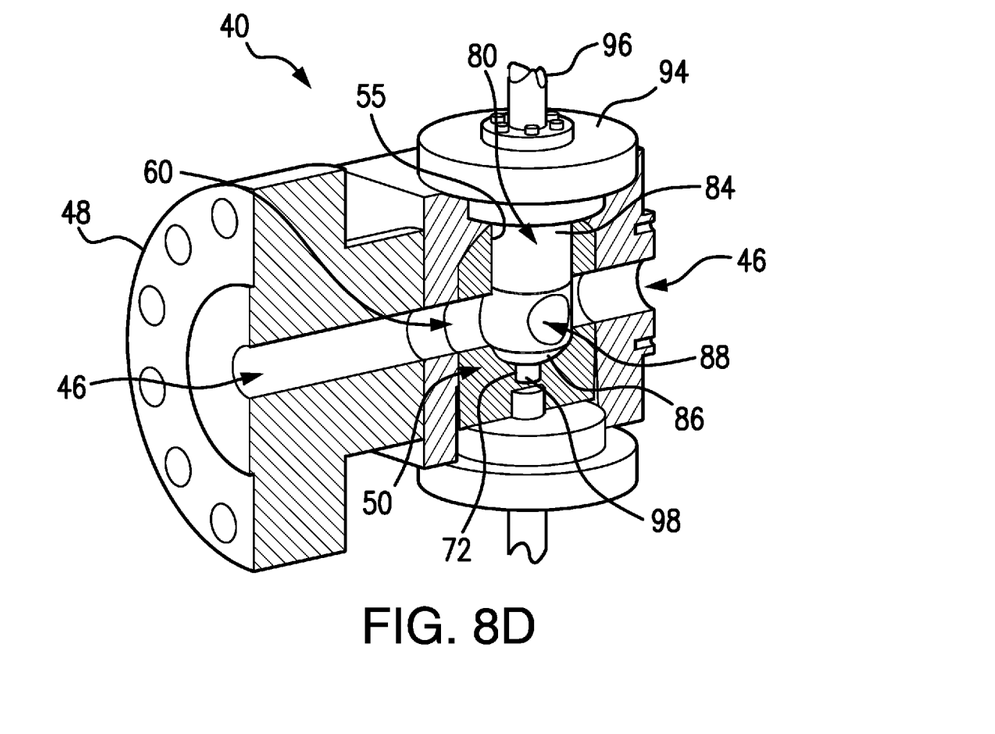

Referring additionally to FIG. 8C, a pair of annular grooves 90 are formed in the cylindrical outer surface portion 84 of the body portion 82 above and below the through hole 88. A pair of O-rings 92 are received in the annular grooves 90 such that a watertight or gastight seal is formed between the O-rings 92 and the cylindrical sidewall 55 of the interior cavity 58 of the outer cylinder 50, both above and below the through hole 88. A bonnet 94 is disposed at the proximal end of the body portion 82 of the inner cylinder 80, and an actuator stem 96 extends therethrough and is affixed to the proximal end of the body portion 82 of the inner cylinder 80. The actuator stem 96 may be used to rotate the inner cylinder 80 from a first position in which the through hole 88 is aligned with both the through hole 60 of the outer cylinder 50 and the flow tube 46 of the valve body 42, as shown in FIG. 8C, to a second position in which the through hole 88 of the inner cylinder 80 is not aligned with either the through hole 60 of the outer cylinder 50 or the flow tube 46 of the valve body 42, thereby preventing the flow of fluid through the dual shut-off valve 40. In order to provide dual shut-off functionality, the outer cylinder 50 is rotated to the position shown in FIG. 8B and the inner cylinder 80 is rotated to the position shown in FIG. 8D. As such, although the through holes 60 and 88 of the outer cylinder and inner cylinder 80 are aligned, neither through hole 60 nor 88 is aligned with the flow tube 46 of the dual shut-off valve 40. A trunnion projection 98 extending outwardly from the dome-shaped outer surface portion 86 of the inner cylinder 80 and is received in the trunnion recess 72 to insure proper alignment of the outer and inner cylinders 50 and 80 during rotation with respect to each other.

Figure 9:
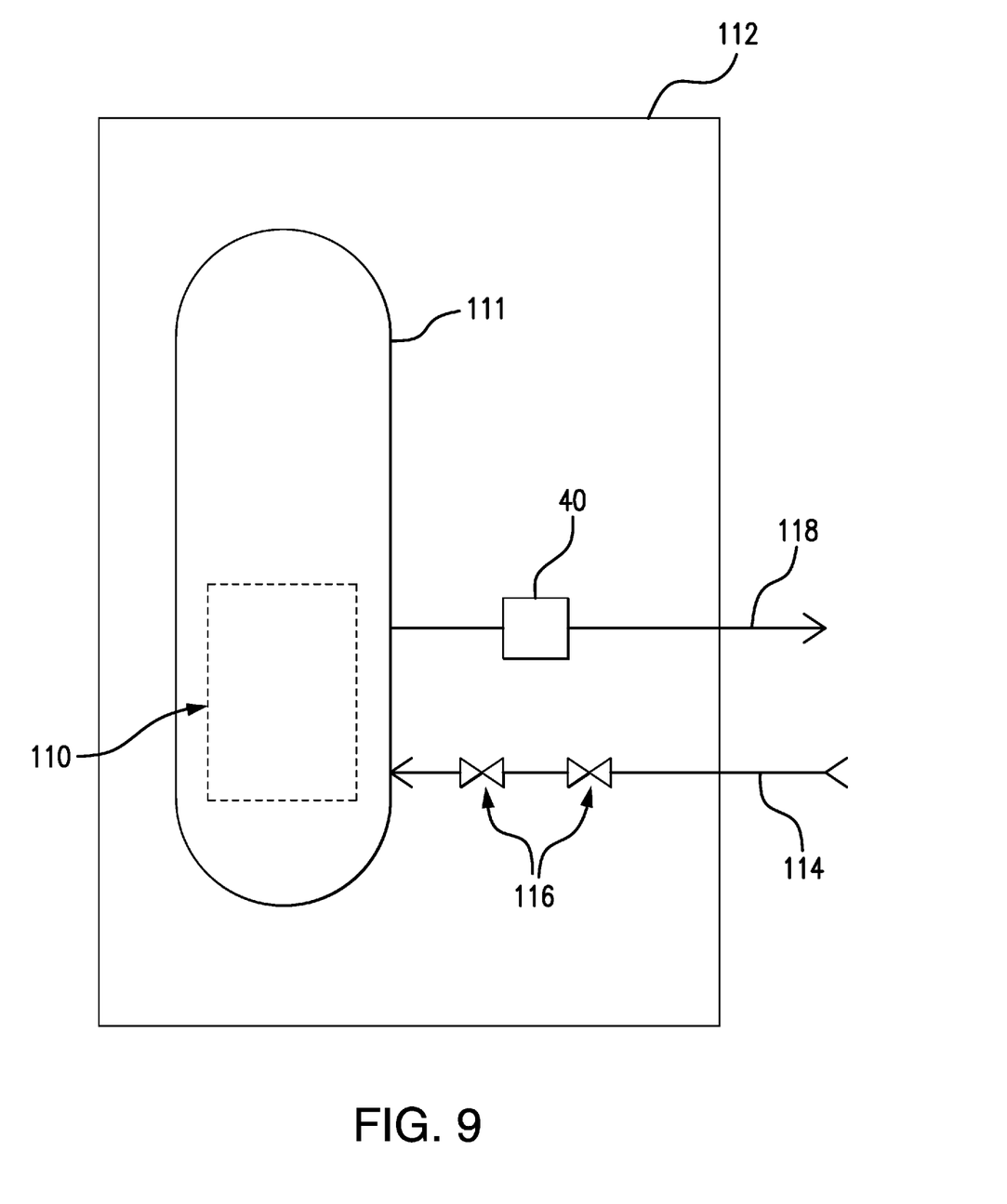
FIG. 9 is a schematic diagram showing use of a dual ball-type shut off valve in accordance with the present invention in use in conjunction with a nuclear reactor.

FIG. 9 shows dual shut-off valve 40 used in conjunction with a nuclear reactor 110. As shown, nuclear reactor 110 is located within a containment building 112. The supply coolant line 114 into pressure vessel 111 includes two independent check valves 116 in series. Valve 40 is located along the coolant exit line 118 from the pressure vessel 111.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

The invention claimed is:

1. A dual shut-off valve comprising:
a valve body defining an interior cavity and a flow tube passing therethrough;
an outer cylinder including a body portion defining an interior cavity and an outer cylinder through hole passing therethrough, the outer cylinder being rotatably disposed within the interior cavity of the valve body; and
an inner cylinder including a body portion defining an inner cylinder through hole passing therethrough, the inner cylinder being rotatably disposed within the interior cavity of the outer cylinder,
wherein the inner cylinder and the outer cylinder are both rotatable between a first position in which a longitudinal center axis of the outer cylinder through hole and a longitudinal center axis of the inner cylinder through hole are aligned with a longitudinal center axis of the flow tube, and a second position in which the longitudinal center axes of the through holes of the outer cylinder and the inner cylinder are not aligned with the longitudinal center axis to the flow tube;
wherein the inner cylinder is rotatable with respect to the valve body independently of the outer cylinder.

2. The dual shut-off valve of claim 1, further comprising an inner cylinder valve actuator and an outer cylinder valve actuator, wherein the valve actuators extend outwardly from opposing sides of the valve body.

3. The dual shut-off valve of claim 1, further comprising:
a pair of annular grooves defined in a cylindrical outer surface of the body portion of the outer cylinder, wherein the annular grooves are parallel to each other and disposed on opposite sides of the through hole of the outer cylinder.

4. The dual shut-off valve of claim 3, further comprising:
a pair of O-rings, wherein each 0-ring is disposed within a corresponding one of the annular grooves of the outer cylinder.

5. The dual shut-off valve of claim 1, wherein an axis of rotation of the outer cylinder is aligned with an axis of rotation of the inner cylinder.

6. The dual shut-off valve of claim 5, wherein the outer cylinder has a cylindrical outer surface portion and a dome-shaped outer surface portion at a distal end thereof.

7. The dual shut-off valve of claim 6, wherein an outer surface of the inner cylinder is correspondingly-shaped to the interior cavity of the outer cylinder.

8. The dual shut-off valve of claim 7, wherein the interior cavity of the outer cylinder has a substantially cylindrical sidewall portion and a dome shaped bottom wall opposite the dome-shaped outer surface portion.

9. The dual shut-off valve of claim 8, wherein the dome shaped bottom wall defines a trunnion recess in which a trunnion projection of the inner cylinder is received.

10. The dual shut-off valve of claim 8, further comprising:
a pair of annular grooves defined in a cylindrical outer surface of the body portion of the inner cylinder, wherein the annular grooves are parallel to each other and disposed on opposite sides of the through hole of the inner cylinder; and
a pair of O-rings, wherein each O-ring is disposed within a corresponding one of the annular grooves of the inner cylinder.

11. A nuclear reactor disposed with a containment structure, comprising:
a reactor core disposed within a pressure vessel;
a coolant outlet line passing through both the pressure vessel and the containment structure; and
a first dual shut-off valve both disposed within the containment structure and in fluid communication with the coolant outlet line, comprising:
a valve body defining an interior cavity and a flow tube passing therethrough;
an outer cylinder including a body portion defining an interior cavity and an outer cylinder through hole passing therethrough, the outer cylinder being rotatably disposed within the interior cavity of the valve body; and an inner cylinder including a body portion defining an inner cylinder through hole passing therethrough, the inner cylinder being rotatably disposed within the interior cavity of the outer cylinder, wherein the inner cylinder and the outer cylinder are both rotatable between a first position in which a longitudinal center axis of the outer cylinder through hole and a longitudinal center axis of the inner cylinder through hole are aligned with a longitudinal center axis of the flow tube, and a second position in which the longitudinal center axes of the through holes of the outer cylinder and the inner cylinder are not aligned with the longitudinal center axis to the flow tube;

wherein the inner cylinder of the first dual shut-off valve is rotatable with respect to the valve body independently of the outer cylinder.

12. The nuclear reactor of claim 11, wherein the first shut-off valve further comprises an inner cylinder valve actuator and an outer cylinder valve actuator, wherein the valve actuators extend outwardly from opposite sides of the valve body.

13. The nuclear reactor of claim 11, wherein the first shut-off valve further comprises:

a pair of annular grooves defined in a cylindrical outer surface of the body portion of the outer cylinder, wherein the annular grooves are parallel to each other and disposed on opposite sides of the through hole of the outer cylinder.

14. The nuclear reactor of claim 13, wherein the first shut-off valve further comprises:

a pair of O-rings, wherein each O-ring is disposed within a corresponding one of the annular grooves of the outer cylinder.

15. The nuclear reactor of claim 11, wherein an axis of rotation of the outer cylinder is aligned with an axis of rotation of the inner cylinder.

16. The nuclear reactor of claim 15, wherein the outer cylinder has a cylindrical outer surface portion and a dome-shaped outer surface portion at a distal end thereof.

17. The nuclear reactor of claim 16, wherein an outer surface of the inner cylinder is correspondingly-shaped to the interior cavity of the outer cylinder.

18. The nuclear reactor of claim 17, wherein the interior cavity of the outer cylinder has a substantially cylindrical sidewall portion and a dome shaped bottom wall opposite the dome-shaped outer surface portion.

19. The nuclear reactor of claim 18, wherein the dome shaped bottom wall defines a trunnion recess in which a trunnion projection of the inner cylinder is received.

20. The nuclear reactor of claim 18, further comprising:

a pair of annular grooves defined in a cylindrical outer surface of the body portion of the inner cylinder, wherein the annular grooves are parallel to each other and disposed on opposite sides of the through hole of the inner cylinder; and a pair of O-rings, wherein each O-ring is disposed within a corresponding one of the annular grooves of the inner cylinder.

* * * * *

UNITED STATES PATENT AND TRADEMARK OFFICE
CERTIFICATE OF CORRECTION

PATENT NO. : 11,732,811 B2
APPLICATION NO. : 17/339601
DATED : August 22, 2023
INVENTOR(S) : James Brian Inman It is certified that error appears in the above-identified patent and that said Letters Patent is hereby corrected as shown below:

On the Title Page
In item (56) References Cited, under "U.S. PATENT DOCUMENTS", delete "Eldone" and insert
--Hulsey--

In the Specification
In Column 1, Line 24, delete "if" and insert --If--
In Column 3, Line 18, delete "ire FIGS." and insert --in FIG.--

In the Claims
In Column 6, Claim 4, Line 28, delete "0-ring" and insert --O-ring--

Signed and Sealed this
Second Day of April, 2024

Katherine Kelly Vidal
*Director of the United States Patent and Trademark Office*